3,325,503
POLYCHLORO DERIVATIVES OF MONO- AND DI-
CYANO PYRIDINES AND A METHOD FOR
THEIR PREPARATION
Russell M. Bimber, Painesville, Ohio, assignor to Diamond Alkali Company, Cleveland, Ohio, a corporation of Delaware
No Drawing. Filed Feb. 18, 1965, Ser. No. 433,764
11 Claims. (Cl. 260—294.9)

This invention relates to compositions of matter and methods for their preparation, and more particularly to a class of novel chemical compounds of high pesticidal activity and to a novel method for the preparation of these and similar compounds.

The novel compounds of this invention are substituted pyridines of the formula

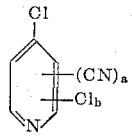

wherein $a$ is 1 or 2 and $b$ is equal to 4-$a$. Thus, these compounds are pyridines in which all of the nuclear hydrogen atoms have been replaced by chlorine atoms or cyano groups.

The following are illustrative of the compounds of this invention.

3-cyanotetrachloropyridine

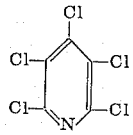

2-cyanotetrachloropyridine

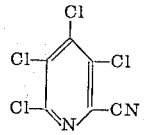

2,6-dicyanotrichloropyridine

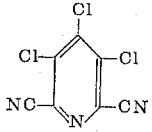

3,5-dicyanotrichloropyridine

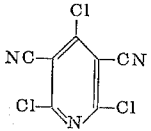

The compounds of this invention may be prepared by chlorination of cyano-substituted pyridines. Many of these cyano-substituted pyridines are commercially available; those that are not so available may easily be prepared, e.g., by the "ammoxidation" method described in Chemical Engineering Progress, September 1964, pages 48–49.

The chlorination reaction may be carried out according to processes already known in the prior art; for example, the appropriate pyridine compound may be reacted with chlorine at high pressures, or with phosphorus pentachloride or phosphorus oxytrichloride. However, one aspect of this invention is the discovery that the compounds of this invention in particular, and chlorinated pyridine compounds in general, may conveniently and easily be prepared by reacting the non-chlorinated pyridine with chlorine in the vapor phase, in the presence of a suitable solid catalyst and at a temperature of about 200–500° C. This method of reaction provides higher yields than previously available, in a considerably shorter time than is necessary when prior art methods are used.

In a preferred method of operation according to the process of this invention, a solid catalyst mass is heated to a temperature of about 200–500° C. This catalyst may comprise, for example, alumina, silica, kaolin or similar natural clay, iron hydroxide, or preferably, activated carbon. It is frequently advantageous to modify the catalyst with a material such as barium chloride; this is particularly true if the catalyst is carbon.

When the catalyst has reached the desired temperature, the pyridine compound is slowly added thereto. At the same time, chlorine gas is admitted and passes through the catalyst bed in contact with the pyridine. The volume ratio of chlorine gas to pyridine is in the range of about 0.4 to 10. Nitrogen or other suitable inert carrier gas is preferably added with the chlorine in order to help sweep the product off the catalyst; this is particularly important if the catalyst temperature is below about 300° C. As the pyridine compound and chlorine pass through the heated catalyst, the chlorination reaction takes place. The chlorinated pyridine formed thereby is usually a solid which may be purified by recrystallization or other suitable means, or if a liquid it may be distilled. The yields are almost always better than those produced by previously known methods, and are often 90% or greater.

Ordinarily, the pyridine reactant is a liquid and may be fed into the reaction system without using a solvent. However, if the starting material is a solid it may be dissolved in a suitable inert, thermally stable solvent.

As used in the specification and claims, the terms "pesticide" and "pesticidal" are intended to refer to the killing and/or controlling of the growth of plants, insects, nematodes, microorganisms, fungi, or the like. Thus, it will be appreciated that applications commonly termed herbicidal, nematocidal, insecticidal, fungicidal, or the like are contemplated.

As still another aspect of the present invention, it has been found that the substituted pyridines of this invention, and a number of compounds analogous thereto, are effective pesticides and more particularly are excellent fungicides. The compounds having these pesticidal properties may be represented by the formula

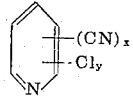

wherein $x$ is a number of from 0 to 2 and $y$ is equal to 5-$x$. These compounds are also useful for protecting cloth, leather, wood and painted surfaces from attack by fungi and other organisms. While it is possible to apply the compounds in undiluted form to the plant or other material to be protected, it is frequently desirable to apply them in admixture with either solid or liquid inert adjuvants. Thus, they can be applied to the plants for fungicidal purposes, for example, by spraying the plants with aqueous or organic solvent dispersions of the compound. Similarly, wood surfaces can be protected by applying a protective film of the compound by brushing, spraying or dipping utilizing a liquid dispersion thereof. The choice of an appropriate solvent is determined largely by the concentration of active ingredient which it is desired to employ, by the volatility required in a solvent, the cost of the solvent and the nature of the material being treated. Among the many suitable organic solvents which can be employed as carriers for the present pesticides, there may be mentioned hydrocarbons such as benzene, toluene, xylene, kerosene, diesel oil, fuel oil and petroleum naphtha; ketones such as acetone, methyl ethyl ketone and cyclohexanone; chlorinated hydrocarbons such as carbon tetrachloride, chloroform, trichloroethylene and perchloroethylene; esters such as ethyl acetate, amyl acetate and butyl acetate; the monoalkyl ethers of ethylene and diethylene glycol, e.g., the monomethyl or monoethyl ethers; alcohols such as ethanol, isopropanol and amyl alcohol; and the like.

The pesticidal compounds can also be applied to plants and other materials along with inert solid adjuvants or carriers such as talc, pyrophyllite, Attaclay, kieselguhr, chalk, diatomaceous earth, lime, calcium carbonate, bentonite, fuller's earth, cottonseed hulls, wheat flour, soybean flour, pumice, tripoli, wood flour, walnut shell flour and lignin.

It is frequently desirable to incorporate a surface active agent in the pesticidal compositions of this invention. Such surface active agents are advantageously employed in both the solid and liquid compositions. The surface active agent can be anionic, cationic or nonionic in character.

Typical classes of surface active agents include alkyl sulfonates, alkylaryl sulfonates, alkyl sulfates, alkylamide sulfonates, alkylaryl polyether alcohols, fatty acid esters of polyhydric alcohols, ethylene oxide addition products of such esters, addition products of long chair mercaptans and ethylene oxide, sodium alkyl benzene sulfonates having 14 to 18 carbon atoms, alkylphenolethylene oxides, e.g., p-isooctaylphenol condensed with 10 ethylene oxide units; and soaps, e.g., sodium stearate and sodium oleate.

The solid and liquid formulations can be prepared by any suitable method. Thus, the active ingredients, in finely divided form if a solid, may be tumbled together with finely divided solid carrier. Alternatively, the active ingredient in liquid form, including solutions, dispersions, emulsions and suspensions thereof, may be admixed with the finely divided solid carrier in amounts small enough to preserve the free-flowing property of the final dust composition.

When solid compositions are employed, in order to obtain a high degree of coverage with a minimum dosage of the formulation, it is desirable that the formulation be in finely divided form. The dust containing active ingredient usually should be sufficiently fine that substantially all will pass through a 20-mesh Tyler sieve. A dust which passes through a 200-mesh Tyler sieve also is satisfactory.

For dusting purposes, preferably formulations are employed in which the active ingredient is present in an amount of 5 to 50% of the total by weight. However, concentrations outside this range are operative and compositions containing from 1 to 99% of active ingredient by weight are contemplated, the remainder being carrier and/or any other additive or adjuvant material which may be desired. It is often advantageous to add small percentages of surface active agents, e.g., 0.5 to 1% of the total composition by weight, to dust formulations.

For spray application, the active ingredient may be dissolved or dispersed in a liquid carrier, such as water or other suitable liquid. The active ingredient can be in the form of a solution, suspension, dispersion or emulsion in aqueous or non-aqueous medium. Desirably, 0.5 to 1.0% by weight of a surface active agent is included in the liquid composition.

For adjuvant purposes, any desired quantity of surface active agent may be employed, such as up to 250% of the active ingredient by weight. If the surface active agent is used only to impart wetting qualities, for example, to the spray solution, as little as 0.05% by weight or less of the spray solution need be employed. The use of larger amounts of surface active agent is not based upon wetting properties but is a function of the physiological behavior of the surface active agent. These considerations are particularly applicable in the case of the treatment of plants. In liquid formulations the active ingredient often constitutes not over 30% by weight of the total and may be 10%, or even as low as 0.01%.

The pesticidal compounds of the present invention can be employed in compositions containing other pesticides, more especially fungicides, insecticides and bactericides, e.g., phenothiazine, pyrethrum, rotenone, DDT, etc.

The invention is illustrated by the following examples.

EXAMPLE 1

*Preparation of pentachloropyridine*

A nickel U-tube is charged with an activated carbon catalyst impregnated with 27% barium chloride; the U-tube is filled with catalyst to within about 2 inches of the top in each arm. One arm of the U-tube is fitted with a Y-shaped adapter connected to a chlorine inlet and a vented addition funnel containing pyridine. The other arm of the nickel U-tube is connected via a glass U-tube to a three-necked flask fitted with a reflux condenser which is in turn connected to a vacuum aspirator.

The activated carbon catalyst is heated to a temperature of 370–378° C., and the pyridine is allowed to flow dropwise onto the catalyst. Nitrogen is passed into the system by means of the vented addition funnel. Chlorine is added through the gas addition tube at such a rate that a slight color of free chlorine is observed in the receiver. Addition of pyridine and chlorine continues for about 50 minutes, the pyridine addition rate being about one drop per 5 seconds for a total pyridine charge of approximately 30 ml. The solid product is collected in the three-necked flask. A vapor phase chromatographic analysis of the product indicates that it is about 95% pure.

The solid product is recrystallized from tetrachloride with activated charcoal treatment to remove color. After two recrystallizations, there is obtained 11.5 grams of solid pentachloropyridine, melting at 125–126.5° C.

EXAMPLE 2

*Preparation of 4-cyanotetrachloropyridine*

In the apparatus described in Example 1, 65 grams of 4-cyanopyridine is charged onto the catalyst heated to a temperature of 375–384° C., in combination with chlorine and nitrogen. The total addition time for the 4-cyanopyridine is 2 hours, 15 minutes. The product is removed from the three-necked flask which is then rinsed with chloroform; the chloroform is evaporated and the combined solid products are recrystallized from carbon tetrachloride (115 ml.), with activated carbon treatment to remove color. The resulting 4-cyanotetrachloropyridine has a melting point of 138–140° C.; the yield is 87.3% crude and 57.2% pure. Elemental analysis gives the following results. Calculated: Cl, 58.6%; N, 11.58%. Found: Cl, 59.0%; N, 11.3%.

EXAMPLE 3

*Preparation of 3-cyanotetrachloropyridine*

In the apparatus and over the catalyst of Example 1, 72 grams of 3-cyanopyridine is chlorinated by the process described in Example 1, at a catalyst temperature of 379–391° C. After chlorination is complete, an aspirator vacuum is applied in order to remove the material remaining in contact with the catalyst. The product is removed from the three-necked flask and the flask is then rinsed with chloroform, the chloroform evaporated and the residual product combined with the previously recovered product. The crude chlorinated material thus obtained weighs 135 grams; it is recrystallized from about 500 milliliters of carbon tetrachloride with activated carbon treatment. The pure product, weighing 96 grams (57.2% of the theoretical amount), melts at 148–149.5° C. The chlorine content is 58.0% as combined with a theoretical value of 58.6%.

EXAMPLE 4

*Preparation of 2-cyanotetrachloropyridine*

Using the equipment and procedure described in Example 1, 28 grams of 2-cyanopyridine is chlorinated at 372–377° C. over a period of 45 minutes. To avoid plugging of the catalyst, the last portion of the reaction is carried out under aspirator vacuum. The product (37 grams crude) is recrystallized from carbon tetrachloride, yielding about 25 grams of pure product melting at 148–150° C.

EXAMPLE 5

*Preparation of 3,5-dicyanotrichloropyridine*

Following the same procedure as described in Examples 1–4, 61 grams of 3,5-dicyanopyridine is reacted with chlorine over a barium chloride-activated carbon catalyst at a temperature of 384–399° C. There is obtained 72 grams of crude chlorinated product which is recrystallized from a mixture of equal volumes of chloroform and carbon tetrachloride. The purified product, 3,5-dicyanotrichloropyridine, melts at 169–170.5° C. The following analytical results are obtained. Calculated: Cl, 45.75%; N, 18.08%. Found: Cl, 45.8%; N, 17.9%.

EXAMPLE 6

*Preparation of 2,6-dicyanotrichloropyridine*

The apparatus and catalyst of Example 1 are used. 2,6-dicyanopyridine, 10.8 grams, is melted and placed in the addition funnel. It is added dropwise to the catalyst maintained at 315–320° C., along with chlorine added at such a rate that a chlorine color is observed in the receiver. No product appears in the receiver until the temperature of the catalyst is raised to 350° C. and the aspirator vacuum is applied. The solid product is recovered and combined with the material obtained by rinsing the catalyst with chloroform and evaporating the solvent. The combined solids are recrystallized from a chloroform-carbon tetrachloride mixture. The product 2,6-dicyanotrichloropyridine melts at 204–205.5° C.

EXAMPLE 7

*Fungicidal activity—Pea seed decay and damping off Sclerotium rolfsii*

Air dry sterile soil is infested with the organism *Sclerotium rolfsii*. The soil is placed in plastic pots. An appropriate amount of test formulation is poured onto the soil to give the desired rate of application, e.g., 25 ml. is equivalent to a dosage of 64 pounds per acre on a broadcast basis. This test formulation contains 0.2 gram of the test compound, 4 ml. of acetone, 2 ml. of 0.5% aqueous Triton X-155 stock emulsifier solution and 94 ml. of distilled water. The concentration of toxicant in this formulation is 2000 parts per million. The test formulation is thoroughly incorporated into the soil by emptying the contents of the pot into a container and shaking vigorously. A non-inoculated treated control is also run to determine the phytotoxicity of each test compound. Twenty-five perfection peas are planted in the treated soil in each box. Each box receives 50 ml. of water and is placed in a humidity chamber maintained at 70° F. for 1 day. The boxes are then transferred to the greenhouse. Effectiveness of the test chemical is determined by the percentage of plants growing 11 and 15 days after treatment and planting.

| Compound Tested | Concentration, lbs./acre | Number of days | Percent Stand | |
|---|---|---|---|---|
| | | | Non-inoculated | Inoculated |
| 4-cyanotetrachloropyridine | 32 | 11 | 100 | 100 |
| | 16 | 11 | 100 | 100 |
| | 8 | 11 | 100 | 78 |
| 3-cyanotetrachloropyridine | 32 | 11 | 100 | 100 |
| | 16 | 11 | 100 | 100 |
| | 8 | 11 | 100 | 100 |
| 2-cyanotetrachloropyridine | 48 | 11 | -------- | 100 |
| 3,5-dicyanotrichloropyridine | 48 | 15 | -------- | 100 |

EXAMPLE 8

*Fungicidal activity—cucumber seed decay and damping off R. solani*

Air dry sterile soil is infested with the organism *Rhizoctonia solani*. The soil is placed in plastic pots. An appropriate amount of test formulation is poured onto the soil to give the desired rate of application, e.g., 25 ml. is equivalent to a dosage of 64 pounds per acre on a broadcast basis. This test formulation contains the test compound, acetone, stock emulsifier solution and distilled water. The concentration of toxicant in this formulation is 2000 parts per million. The test formulation is thoroughly incorporated into the soil by emptying the contents of the pot into a container and shaking vigorously. A non-inoculated treated control is also run to determine the phytotoxicity of each test compound. Twenty-five cucumber seeds are planted in the treated soil in each pot. Each pot receives 50 ml. of water and is placed in a humidity chamber maintained at 70° F. for 1 day. The pots are then transferred to the greenhouse. Effectiveness of the test chemical is determined by the percentage of plants growing 7 and 14 days after treatment and planting.

| Compound Tested | Concentration, lbs./acre | Number of days | Percent Stand | |
|---|---|---|---|---|
| | | | Non-inoculated | Inoculated |
| 4-cyanotetrachloropyridine | 16 | 7 | -------- | 100 |
| | | 14 | 100 | 100 |
| | 8 | 7 | -------- | 100 |
| | | 14 | 100 | 52 |
| 3-cyanotetrachloropyridine | 8 | 7 | -------- | 100 |
| | | 14 | 100 | 98 |
| 2-cyanotetrachloropyridine | 48 | 14 | -------- | 100 |
| 3,5-dicyanotrichloropyridine | 48 | 14 | -------- | 100 |
| Pentachloropyridine | 32 | 7 | -------- | 100 |
| | | 13 | 100 | 100 |

EXAMPLE 9

*Herbicidal activity—post-emergence soil, broadleaf and grassy*

To evaluate the post-emergence activity of test chemicals applied to the foilage of seedling plants, as well as to the soil in which they are growing, two mixtures of seeds are planted in sterilized composted greenhouse soil. One seed mixture contains three broadleaf (buckwheat, turnip and aster) and the other contains three grass species (sorghum, Italian millet and perennial ryegrass). The soil is divided diagonally into two equal areas, and the broadleaves are seeded into one of these areas and the grasses into the other. The seeds are then covered uniformly with about ¼-inch of soil and watered, after which they are removed to the greenhouse and the test species are allowed to grow until one true leaf is present on the slowest growing broadleaf. This requires between 9 to 14 days depending upon the time of the year. When the plants (seedlings) have reached this stage of development the containers are sprayed at 10 p.s.i., uniformly covering the surface of the soil and the foliage with 40 ml. of test formulation at a dosage of up to 24 pounds per acre. The formulation for this test contains 0.125 gram of the toxicant, 22 ml. of water, 20 ml. of acetone and 2 drops of Triton X–155 emulsifier for a 24 lbs. per acre dosage.

The weeks after treatment percent control is estimated and information on phytotoxicity, growth regulation, and other effects are recorded. Using this procedure, the following results are obtained.

| Compound Tested | Concentration, lbs./acre | Percent Control | |
|---|---|---|---|
| | | Broadleaf weeds | Grassy weeds |
| 4-cyanotetrachloropyridine | 16 | 90 | 95 |
| | 8 | 75 | 85 |
| 3-cyanotetrachloropyridine | 8 | 95 | 95 |
| | 4 | 90 | 85 |
| Pentachloropyridine | 8 | 80 | |
| 3,5-dicyanotrichloropyridine | 8 | 80 | 90 |
| | 4 | 80 | 50 |
| | 2 | 80 | 25 |

It is to be understood that the invention is not limited by the specific examples and embodiments described hereinabove, but includes such changes and modifications as may be apparent to one skilled in the art upon reading the appended claims.

What is claimed is:
1. Compounds of the formula

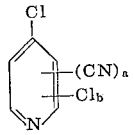

wherein $a$ is an integer from 1 to 2, inclusive, and $b$ is equal to 4-$a$.
2. 3-cyanotetrachloropyridine.
3. 2-cyanotetrachloropyridine.
4. 2,6-dicyanotrichloropyridine.
5. 3,5-dicyanotrichloropyridine.
6. A method for the preparation of 3-cyanotetrachloropyridine which comprises reacting chlorine with 3-cyanopyridine in the vapor phase at a temperature of about 300–400° C., over a carbon catalyst activated with barium chloride.

7. A method for the preparation of 2-cyanotetrachloropyridine which comprises reacting chlorine with 2-cyanopyridine in the vapor phase at a temperature of about 300–400° C., over a carbon catalyst activated with barium chloride.

8. A method for the preparation of 2,6-dicyanotrichloropyridine which comprises reacting chlorine with 2,6-dicyanopyridine in the vapor phase at a temperature of about 300–400° C., over a carbon catalyst activated with barium chloride.

9. A method for the preparation of 3,5-dicyanotrichloropyridine which comprises reacting chlorine with 3,5-dicyanopyridine in the vapor phase at a temperature of about 300–400° C., over a carbon catalyst modified with barium chloride.

10. A method for the preparation of a compound according to claim 1 which comprises reacting chlorine with a compound of the formula

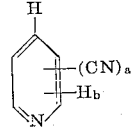

wherein $a$ is an integer from 1 to 2, inclusive, and $b$ is equal to 4-$a$; said chlorination being effected in the vapor phase at a temperature of about 200° to 500° C. and in the presence of a catalyst selected from the group consisting of alumina, silica, natural clays, iron hydroxide and activated carbon, modified with barium chloride.

11. A method for the preparation of a compound according to claim 1 which comprises reacting chlorine with a compound of the formula

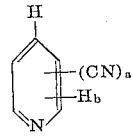

wherein $a$ is an integer from 1 to 2, inclusive, and $b$ is equal to 4-$a$; said chlorination being effected in the vapor phase at a temperature of about 200° to 500° C. and in the presence of an activated carbon catalyst modified with barium chloride.

References Cited

Case: J. Am. Chem. Soc., vol. 47, pp. 1143–46 (1925).
Wibaut et al.: Rec. Trav. Chim, 58, pp. 709–721 (1939).

WALTER A. MODANCE, *Primary Examiner.*
ALAN ROTMAN, *Assistant Examiner.*